(12) United States Patent
Stack

(10) Patent No.: US 8,302,491 B2
(45) Date of Patent: Nov. 6, 2012

(54) VIBRATORY FLOW METER AND METHOD FOR DETERMINING A FLUID TEMPERATURE OF A FLOW MATERIAL

(75) Inventor: Charles Paul Stack, Broomfield, CO (US)

(73) Assignee: Micro Motion, Inc., Boulder, CO (US)

(*) Notice: Subject to any disclaimer, the term of this patent is extended or adjusted under 35 U.S.C. 154(b) by 309 days.

(21) Appl. No.: 12/678,815

(22) PCT Filed: Oct. 15, 2007

(86) PCT No.: PCT/US2007/081413
§ 371 (c)(1),
(2), (4) Date: Mar. 18, 2010

(87) PCT Pub. No.: WO2009/051588
PCT Pub. Date: Apr. 23, 2009

(65) Prior Publication Data
US 2010/0206090 A1    Aug. 19, 2010

(51) Int. Cl.
*G01F 1/84* (2006.01)
(52) U.S. Cl. ............... 73/861.356; 73/861.357
(58) Field of Classification Search .................. None
See application file for complete search history.

(56) References Cited

U.S. PATENT DOCUMENTS

| | | | |
|---|---|---|---|
| 4,768,384 A * | 9/1988 | Flecken et al. | 73/861.02 |
| 5,373,745 A | 12/1994 | Cage | |
| 5,423,225 A | 6/1995 | Cage | |
| 5,827,979 A * | 10/1998 | Schott et al. | 73/861.357 |
| 6,327,915 B1 * | 12/2001 | Van Cleve et al. | 73/861.357 |
| 6,512,987 B1 | 1/2003 | Pattern | |
| 7,216,550 B2 | 5/2007 | Lesjak et al. | |
| 2003/0055580 A1 | 3/2003 | Normen | |
| 2005/0125167 A1 | 6/2005 | Lesjack | |
| 2007/0213945 A1 | 9/2007 | Tombs | |

FOREIGN PATENT DOCUMENTS

| | | |
|---|---|---|
| EP | 0701107 A2 | 3/1996 |
| EP | 1530030 A2 | 5/2005 |
| JP | 63158420 A | 7/1988 |
| JP | 08114476 | 7/1996 |
| JP | 10104040 | 4/1998 |
| JP | 2003503723 A | 1/2008 |
| WO | 0102816 A2 | 1/2001 |
| WO | 2004003483 A1 | 1/2004 |

* cited by examiner

*Primary Examiner* — Harshad R Patel
(74) *Attorney, Agent, or Firm* — The Ollila Law Group LLC (57) ABSTRACT

A vibratory flow meter (5) for determining a derived fluid temperature $T_{f\text{-}derive}$ of a flow material is provided according to the invention. The vibratory flow meter (5) includes a flow meter assembly (10) including one or more flow conduits (103), a meter temperature sensor (204) configured to measure a meter temperature $T_m$, an ambient temperature sensor (208) for measuring an ambient temperature $T_a$, and meter electronics (20) coupled to the meter temperature sensor (204) and to the ambient temperature sensor (208). The meter electronics (20) is configured to receive the meter temperature $T_m$ and the ambient temperature $T_a$ and determine the derived fluid temperature $T_{f\text{-}deriv}$ of the flow material in the vibratory flow meter (5) using the meter temperature $T_m$ and the ambient temperature $T_a$.

24 Claims, 6 Drawing Sheets

VIBRATORY FLOW METER AND METHOD FOR DETERMINING A FLUID TEMPERATURE OF A FLOW MATERIAL

BACKGROUND OF THE INVENTION

1. Field of the Invention

The present invention relates to a vibratory flow meter and method, and more particularly, to a vibratory flow meter and method for determining a fluid temperature of a flow material.

2. Statement of the Problem

Vibrating conduit sensors, such as Coriolis mass flow meters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as by two independent pairs of wires. The instrumentation receives signals from the two pickoff sensors and processes the signals in order to derive a mass flow rate measurement.

Vibratory flow meters, such as Coriolis meters and vibratory densitometers, measure mass flow and density through the influence that these fluid properties have on a vibrating flow conduit or flow conduits. However, flow conduit vibration is also influenced by other variables, and the influence of these variables must be compensated for in the meter.

One variable that is known to affect measurement accuracy is temperature. Temperature affects the material and dimensional properties of the flow conduit (or conduits). As a result, the temperature of the flow material impacts the fluid vibration. In addition, the meter will achieve the temperature of the flow material over time, wherein the operational properties will change with the change in temperature.

The temperature of interest is the temperature of the vibrating flow conduit. However, for fluids with high heat capacity, this temperature is for all practical purposes equal to the fluid temperature.

The measurement of the temperature of the flow sensor is not a trivial task. One issue is the mounting of a temperature sensor. Poor temperature sensor mounting lowers the heat transfer through the meter and results in temperature measurement errors. Another issue is whether a meter temperature accurately reflects the temperature of the flow material. Depending on the heat transfer capability of the meter, the ambient temperature, and a temperature difference between the flow material and the meter, for example, the meter temperature will lag the actual temperature of the flow material. In addition, coating of the inside of the flow meter will affect the heat transfer properties.

SUMMARY OF THE INVENTION

A vibratory flow meter for determining a derived fluid temperature $T_{f\text{-}deriv}$ of a flow material is provided according to the invention. The vibratory flow meter comprises a flow meter assembly including one or more flow conduits, a meter temperature sensor configured to measure a meter temperature $T_m$, an ambient temperature sensor for measuring an ambient temperature $T_a$, and meter electronics coupled to the meter temperature sensor and to the ambient temperature sensor. The meter electronics is configured to receive the meter temperature $T_m$ and the ambient temperature $T_a$ and determine the derived fluid temperature $T_{f\text{-}deriv}$ of the flow material in the vibratory flow meter using the meter temperature $T_m$ and the ambient temperature $T_a$.

A method for determining a derived fluid temperature $T_{f\text{-}deriv}$ of a flow material in a vibratory flow meter is provided according to the invention. The method comprises measuring a meter temperature $T_m$, measuring an ambient temperature $T_a$, and determining the derived fluid temperature $T_{f\text{-}deriv}$ of the flow material in the vibratory flow meter using the meter temperature $T_m$ and the ambient temperature $T_a$.

A method for determining a derived fluid temperature $T_{f\text{-}deriv}$ of a flow material in a vibratory flow meter is provided according to the invention. The method comprises measuring a meter temperature $T_m$, measuring an ambient temperature $T_a$, determining the derived fluid temperature $T_{f\text{-}deriv}$ of the flow material in the vibratory flow meter using the meter temperature $T_m$ and the ambient temperature $T_a$, and determining one or more flow characteristics of the flow material using the fluid temperature.

A method for determining a derived fluid temperature $T_{f\text{-}deriv}$ of a flow material in a vibratory flow meter is provided according to the invention. The method comprises measuring a meter temperature $T_m$, measuring an ambient temperature $T_a$, and measuring a measured fluid temperature $T_{f\text{-}meas}$. The method further comprises determining the derived fluid temperature $T_{f\text{-}deriv}$ of the flow material in the vibratory flow meter using the meter temperature $T_m$ and the ambient temperature $T_a$ and determining a coating level within one or more flow conduits of the vibratory flow meter using a difference between the measured fluid temperature $T_{f\text{-}meas}$ and the derived fluid temperature $T_{f\text{-}deriv}$.

ASPECTS OF THE INVENTION

In one aspect of the vibratory flow meter, determining the derived fluid temperature $T_{f\text{-}deriv}$ further comprises employing the equation $$T_{f\text{-}deriv} = \frac{(T_m - T_a C_e)}{(1 - C_e)},$$

with $C_e$ comprising a temperature error coefficient.

In another aspect of the vibratory flow meter, the meter electronics are further configured to use the derived fluid temperature $T_{f\text{-}deriv}$ for determining one or more flow characteristics of the flow material.

In yet another aspect of the vibratory flow meter, the meter electronics are further configured to use the derived fluid temperature $T_{f\text{-}deriv}$ for compensating a flow conduit stiffness.

In yet another aspect of the vibratory flow meter, the vibratory flow meter further comprises a fluid temperature sensor configured to measure a measured fluid temperature of $T_{f\text{-}meas}$ the flow material, with the meter electronics being configured to determine the derived fluid temperature $T_{f\text{-}deriv}$ of the flow material in the vibratory flow meter using the meter temperature $T_m$ and the ambient temperature $T_a$ and determine a coating level within one or more flow conduits of the vibratory flow meter using a difference between the measured fluid temperature $T_{f\text{-}meas}$ and the derived fluid temperature $T_{f\text{-}deriv}$.

In yet another aspect of the vibratory flow meter, the meter electronics are further configured to determine a temperature error factor $T_{error}$ comprising $T_{error}=|T_{f\text{-}meas}-T_{f\text{-}deriv}|$, compare the temperature error factor $T_{error}$ to a predetermined coating threshold, and generate a coating indication if the temperature error factor $T_{error}$ exceeds the predetermined coating threshold.

In yet another aspect of the vibratory flow meter, the meter electronics are further configured to determine a temperature error factor $T_{error}$ comprising $T_{error}=|T_{f\text{-}meas}-T_{f\text{-}deriv}|$, compare the temperature error factor $T_{error}$ to a predetermined coating threshold, and generate a Sterilization-In-Place (SIP) and/or Clean-In-Place (CIP) indication if the temperature error factor $T_{error}$ exceeds the predetermined coating threshold.

In one aspect of the method, determining the derived fluid temperature $T_{f\text{-}deriv}$ further comprises employing the equation $$T_{f\text{-}deriv} = \frac{(T_m - T_a C_e)}{(1 - C_e)},$$

with $C_e$ comprising a temperature error coefficient.

In another aspect of the method, the method further comprises using the derived fluid temperature $T_{f\text{-}deriv}$ for determining one or more flow characteristics of the flow material.

In yet another aspect of the method, the method further comprises using the derived fluid temperature $T_{f\text{-}deriv}$ for compensating a flow conduit stiffness.

In yet another aspect of the method, the method further comprises measuring a fluid temperature $T_{f\text{-}meas}$, determining a temperature error factor $T_{error}$ comprising $T_{error}=|T_{f\text{-}meas}-T_{f\text{-}deriv}|$, comparing the temperature error factor $T_{error}$ to a predetermined coating threshold, and generating a coating indication if the temperature error factor $T_{error}$ exceeds the predetermined coating threshold.

In yet another aspect of the method, the method further comprises measuring a measured fluid temperature $T_{f\text{-}meas}$, determining a temperature error factor $T_{error}$ comprising $T_{error}=|T_{f\text{-}meas}-T_{f\text{-}deriv}|$, comparing the temperature error factor $T_{error}$ to a predetermined coating threshold, and generating a Sterilization-In-Place (SIP) and/or Clean-In-Place (CIP) indication if the temperature error factor $T_{error}$ exceeds the predetermined coating threshold.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
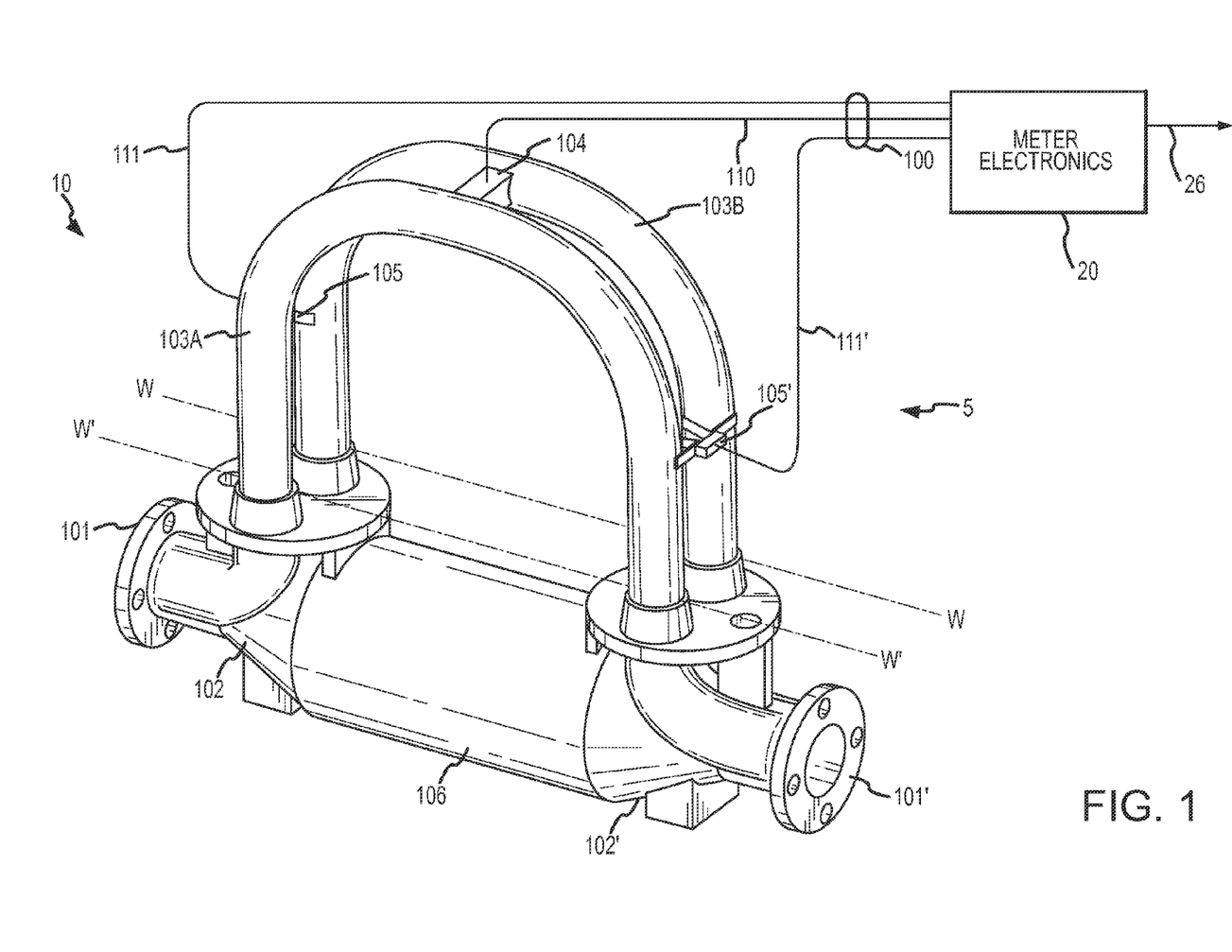
FIG. 1 shows a vibratory flow meter comprising a flow meter assembly and meter electronics.

FIG. 1 shows a vibratory flow meter 5 comprising a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of Coriolis mass flow meter regardless of the number of drivers, pick-off sensors, flow conduits, or the operating mode of vibration. In addition, it should be recognized that the flow meter 5 can alternatively comprise a vibratory densitometer.

The flow meter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

In one embodiment, the flow conduits 103A and 103B comprise substantially U-shaped flow conduits, as shown. Alternatively, in other embodiments, the flow conduits can comprise substantially straight flow conduits. However, other shapes can also be used, and are within the scope of the description and claims.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow material being measured, the flow material enters the flow meter assembly 10 through the flange 101, passes through the inlet manifold 102 where the total amount of flow material is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B are driven by the driver 104 in opposite directions about the respective bending axes W and W' and at what is termed the first out of phase bending mode of the flow meter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a Coriolis flow meter or densitometer and is not intended to limit the teaching of the present invention.

Figure 2:
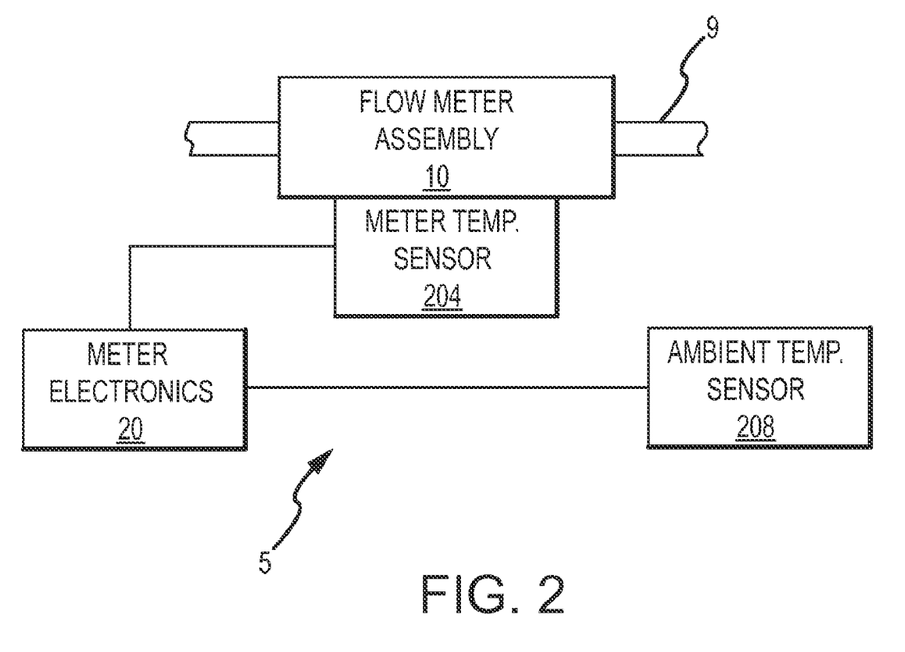
FIG. 2 shows the vibratory flow meter according to an embodiment of the invention.

FIG. 2 shows the vibratory flow meter 5 according to an embodiment of the invention. The vibratory flow meter 5 includes the flow meter assembly 10, the meter electronics 20, a meter temperature sensor 204, and an ambient temperature sensor 208. The meter temperature sensor 204 and the ambient temperature sensor 208 can be coupled to the meter electronics 20 in some embodiments.

The meter temperature sensor 204 is coupled to the flow meter assembly 10. The meter temperature sensor 204 can measure a temperature of a meter portion and consequently can measure a meter temperature $T_m$. In some embodiments, the meter temperature sensor 204 can be positioned at any suitable location on the flow meter assembly 10, including on a flow conduit 103A or 103B or can be positioned on a manifold 102 or 102', for example.

The ambient temperature sensor 208 is positioned away from and out of contact with the flow meter assembly 10. In some embodiments, the ambient temperature sensor 208 is mounted to a case of the flow meter 5. However, it should be understood that the ambient temperature sensor 208 can be mounted at any suitable location. The ambient temperature sensor 208 measures an ambient temperature $T_a$, such as an air temperature, for example. The ambient temperature sensor 208 can be local to or distant from the meter electronics 20.

The ambient temperature doesn't have to strictly be a true ambient temperature. Instead, the ambient temperature $T_a$ can comprise a temperature measurement that is strongly correlated to the ambient temperature, like a case temperature, a feedthrough temperature, etc.

The meter electronics 20 is configured to receive the meter temperature $T_m$ and the ambient temperature $T_a$ and determine a derived fluid temperature $T_{f\text{-}deriv}$ of the flow material in the vibratory flow meter 5 using the meter temperature $T_m$ and the ambient temperature $T_a$.

A benefit is that a flow meter user may want to know the derived fluid temperature $T_{f\text{-}deriv}$ and not the meter temperature $T_m$. Alternatively, the user may want to know both variables.

In some embodiments, determining the derived fluid temperature $T_{f\text{-}deriv}$ further comprises employing the equation:

$$T_{f\text{-}deriv} = \frac{(T_m - T_a C_e)}{(1 - C_e)} \quad (1)$$

Where $C_e$ comprises a calibration temperature error coefficient. The calibration temperature error coefficient $C_e$ is typically determined for a flow meter at a factory calibration process, wherein the ambient temperature $T_a$ and the measured fluid temperature $T_{f\text{-}meas}$ are accurately measured.

Figure 3:
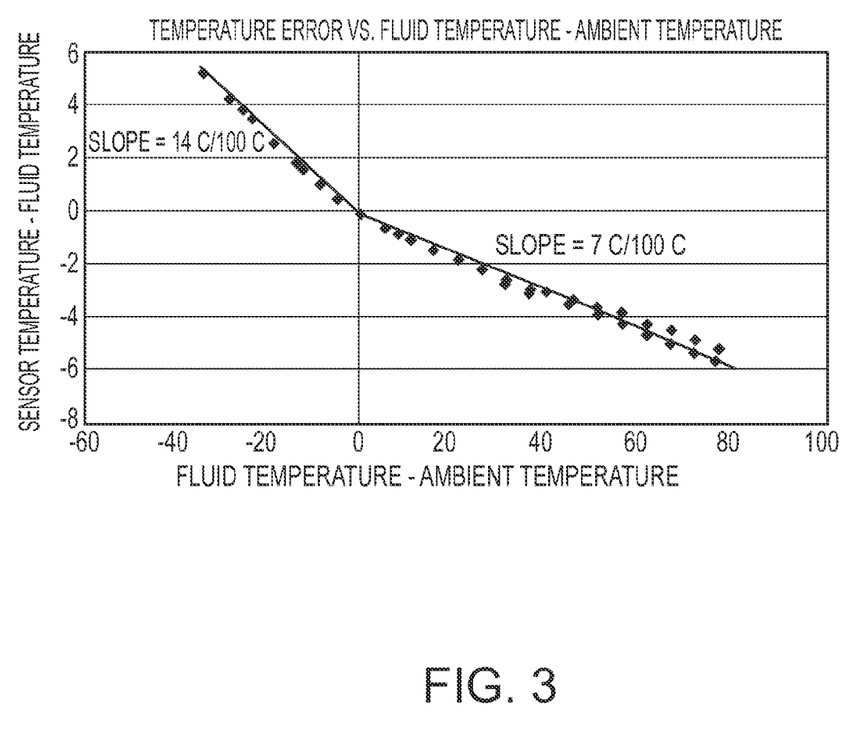
FIG. 3 is a graph of a flow meter temperature error according to an embodiment of the invention.

FIG. 3 is a graph of a flow meter temperature error according to an embodiment of the invention. The temperature error is graphed as a function of meter temperature minus the derived fluid temperature $(T_m - T_{f\text{-}deriv})$ versus the derived fluid temperature $T_{f\text{-}deriv}$ minus ambient temperature $(T_f - T_a)$. The graph shows that the derived fluid temperature $T_{f\text{-}deriv}$ is linearly related to the meter temperature $T_m$ when the ambient temperature $T_a$ is taken into account.

The graph can be expressed formulaically as:

$$T_m = T_{f\text{-}deriv}(1 - C_e) + T_a C_e \quad (2)$$

Where $T_m$ is the measured meter temperature, $T_{f\text{-}deriv}$ is the derived fluid temperature, $T_a$ is the measured ambient temperature, and $C_e$ is the calibration temperature error coefficient. The equation (1) above can be derived from equation (2).

Referring again to FIG. 2, in some embodiments the meter electronics 20 is further configured to use the derived fluid temperature $T_{f\text{-}deriv}$ for determining one or more flow characteristics of the flow material. For example, a mass flow rate ($\dot{m}$) and a density ($\rho$) of a flow material can be determined using the derived fluid temperature $T_f$ deny as an input value. In addition, in some embodiments the meter electronics 20 is further configured to use the derived fluid temperature $T_{f\text{-}deriv}$ for compensating a flow conduit stiffness.

For a set of conditions of the flow meter, (e.g., for a particular temperature, mount, external loads, etc.) the mass flow rate is linearly proportional to the time delay ($\Delta t$) between the pickoff sensors. This relationship is given in equation (3) below.

$$\dot{m} = FCF \cdot (\Delta t - \text{zero}) \quad (3)$$

The FCF term is a proportionality constant and is commonly referred to as the flow calibration factor. The zero value is an empirically derived zero flow offset.

The FCF is primarily dependent upon the stiffness and the geometry of the flow conduits of the flow meter. The geometry includes features such as the locations where the two phase or time measurements are made. The stiffness is dependent on the flow conduit's material properties as well as on the geometry of the flow conduits 103A and 103B. For a particular flow meter, the FCF value and the zero value are found through a calibration process performed with a calibration fluid flowing at two known mass flow rates and at a specific calibration temperature.

If the stiffness or geometry of the flow meter changes during operation, after the time of initial calibration, then the FCF will also change. For example, an increase in the operating temperature to a level above the calibration temperature may result in a change in the stiffness of the flow meter. To ensure accurate mass flow measurement requires that the FCF value and the zero value remain nearly constant. This may be very difficult to achieve. Alternatively, an accurate mass flow measurement requires that a robust method of accounting for changes in the FCF and/or zero values is employed.

The prior art flow meter is typically calibrated at a specific reference temperature ($T_0$). However, in use the flow meter is often operated at temperatures that are different than the reference temperature.

It is known that the modulus of elasticity changes with temperature. As a result, in the prior art the mass flow and density equations have been augmented to account for this effect on the modulus of elasticity. The typical form of the prior art mass flow equation, including temperature compensation for the modulus of elasticity (E) or Young's modulus, is given in equation (4) below.

$$\dot{m} = FCF \cdot (E) \cdot (\Delta t - \text{zero}) \quad (4)$$

The Young's modulus term $E = (1 - \phi \cdot \Delta T)$ defines how the FCF changes corresponding to a change in flowmeter temperature from the reference temperature ($T_0$), where ($\Delta T$) comprises ($T_f - T_0$).

The slope of the above function, $\phi$, is typically determined through experimentation for a particular flow meter design or flow meter family. The ($\phi$) term may be treated as if it is essentially the same as the slope of the modulus of elasticity (E) with temperature. However, the modulus of elasticity is not always linear over the full range of temperatures which a flow meter is operated. To account for this non-linearity, higher order polynomials have been employed to better compensate for this change, such as equation (5) below.

$$\dot{m} = FCF \cdot (1 - \phi_1 \cdot \Delta T - \phi_2 \cdot \Delta T^2 \phi_3 \cdot \Delta T^3 - \phi_4 \cdot \Delta T^4) \cdot (\Delta t - \text{zero}) \quad (5)$$

The higher order polynomial $(1 - \phi_1 \cdot \Delta T - \phi_2 \cdot \Delta T^2 \ldots)$ term defines how the FCF changes with a change in flowmeter temperature. Consequently, the derived fluid temperature $T_{f\text{-}deriv}$ can be used to compensate mass flow rate measurements and to ensure that the mass flow rate measurements are highly accurate. Further, the derived fluid temperature $T_{f\text{-}deriv}$ can be used to compensate a flow conduit stiffness characteristic.

A Coriolis flow meter can also measure the density ($\rho_f$) of a process fluid within the vibrating frame of reference. The period of vibration, squared, is linearly proportional to the mass of the vibrating system divided by its stiffness. For a particular condition of the flow conduits, the stiffness and mass are constant and the fluid density ($\rho_f$) is linearly proportional to the period squared. This relationship is given in equation (6) below.

$$\rho_f = C_1 \cdot K^2 - C_2 \quad (6)$$

The $C_1$ term is a proportionality constant and the $C_2$ term is an offset. The coefficients $C_1$ and $C_2$ are dependent on the stiffness of the flow conduits and on the mass and the volume of fluid within the flow meter. The coefficients $C_1$ and $C_2$ are determined by calibrating the flow meter using two fluids of known density.

The density computation can also be compensated for temperature. The typical form of the density equation, including temperature compensation for the modulus of elasticity, is given in equation (7) below.

$$\rho_f = C_1 \cdot K^2 \cdot (\phi) - C_2 \quad (7)$$

The ($\phi$) term defines how the flow conduit period squared changes with a change in fluid temperature $T_f$ from the reference temperature ($T_0$), as previously discussed (i.e., $T_f - T_0$). The slope of the ($\phi$) function is typically determined through experimentation for a particular flow meter design or flow meter family. It should be noted that higher order functions can be used for refining the effect of temperature on the density temperature compensation process. The ($\phi$) term can be treated as if it is the same as the slope of modulus of elasticity with temperature.

Beneficially, the utilization of the derived fluid temperature $T_{f\text{-}deriv}$ for compensation minimizes errors in the mass flow and density measurements. The mass flow and density measurements are improved by using the derived fluid temperature $T_{f\text{-}deriv}$ rather than using the meter temperature $T_m$. Compensations using the derived fluid temperature $T_{f\text{-}deriv}$ will be more accurate over changing ambient conditions than the meter temperature $T_m$.

Figure 4:
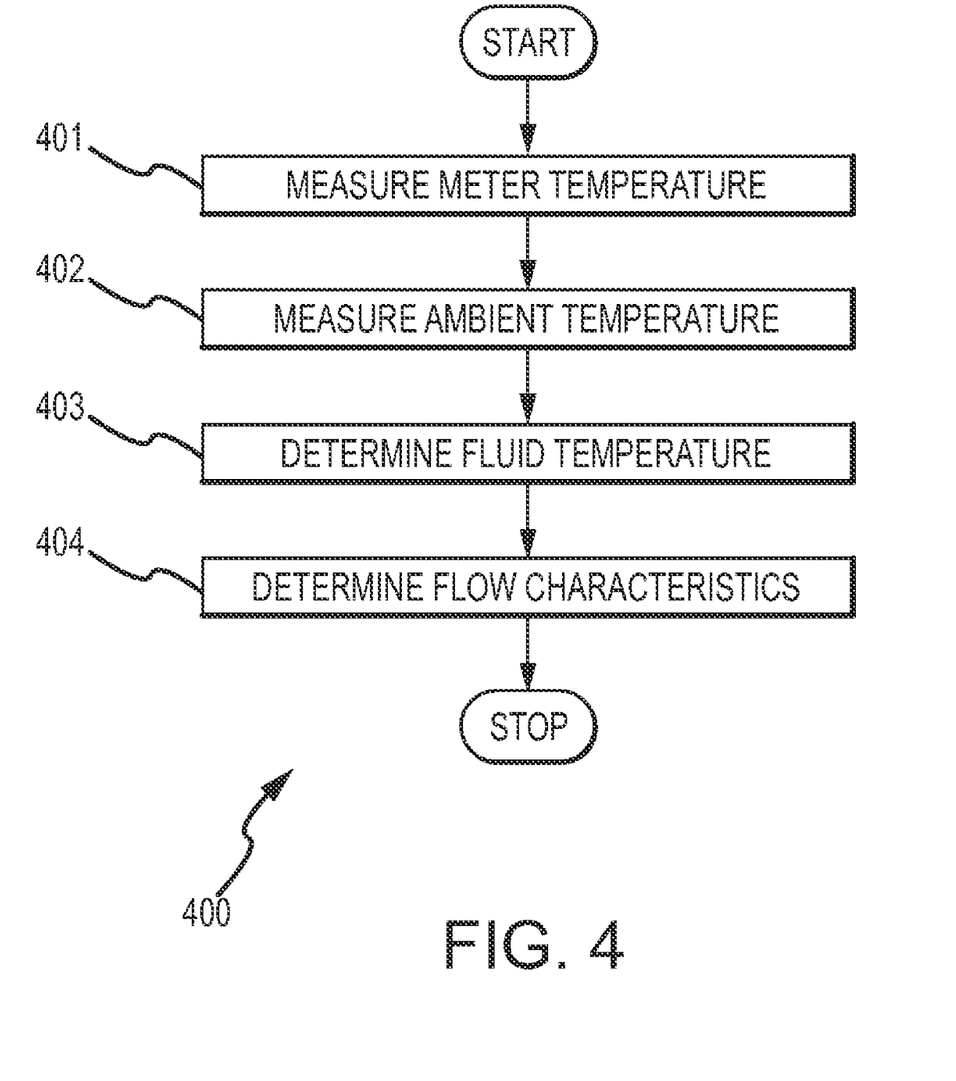
FIG. 4 is a flowchart of a method for determining a derived fluid temperature $T_f$deny of a flow material in a vibratory flow meter according to an embodiment of the invention.

FIG. 4 is a flowchart 400 of a method for determining a derived fluid temperature $T_{f\text{-}deriv}$ of a flow material in a vibratory flow meter according to an embodiment of the invention. In step 401, the temperature of the flow meter is measured in order to obtain a meter temperature $T_m$.

In step 402, an ambient temperature $T_a$ is measured, as previously discussed.

In step 403, the derived fluid temperature $T_{f\text{-}deriv}$ is determined from the meter temperature $T_m$ and the ambient temperature $T_a$, as previously discussed.

In step 404, one or more flow characteristics are determined using the derived fluid temperature $T_{f\text{-}deriv}$, as previously discussed.

Figure 5:
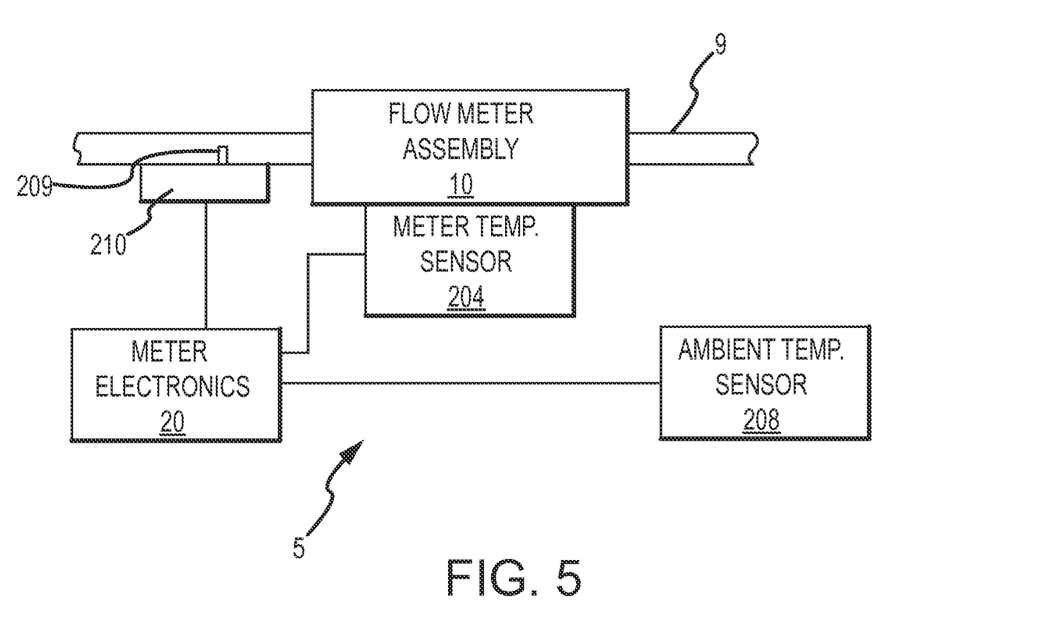
FIG. 5 shows the vibratory flow meter according to an embodiment of the invention.

FIG. 5 shows the vibratory flow meter 5 according to an embodiment of the invention. Components in common with other embodiments share reference numbers. In this embodiment, the flow meter 5 further includes a fluid temperature sensor 210. The fluid temperature sensor 210 can include a sensor element 209 that extends at least partially into the flow conduit 9 and senses a temperature of the flow material in the flow conduit 9. The flow meter 5 therefore generates a measured fluid temperature, in addition to the meter temperature $T_m$ and the ambient temperature $T_a$ and the resulting derived fluid temperature $T_{f\text{-}deriv}$, as previously discussed. The meter electronics 20 can further include a stored or known predetermined coating threshold.

A temperature error factor $T_{error}$ can be generated from the measured fluid temperature $T_{f\text{-}meas}$ and derived fluid temperature $T_{f\text{-}deriv}$, where $T_{error} = |T_{f\text{-}meas} - T_{f\text{-}deriv}|$. The temperature error factor $T_{error}$ can subsequently be used to determine a coating within the flow conduit or flow conduits.

The temperature error factor $T_{error}$ reflects a substantially instantaneous difference between the measured fluid temperature $T_{f\text{-}meas}$ and the derived fluid temperature $T_{f\text{-}deriv}$. The derived fluid temperature $T_{f\text{-}deriv}$ will lag changes in the measured fluid temperature $T_{f\text{-}meas}$. Advantageously, the temperature error factor $T_{error}$ can be used to determine and quantify this lag. The lag is of interest because the lag can be used to detect a thermal transfer change in the flow meter 5, such as due to coating, for example.

Coating comprises an adherence to and buildup of the flow material to the inside surfaces of the flow meter 5. Coating can result in a reduced flow rate, change in flow characteristics, degradation of flow measurements, and other problems, such as inability to drain and/or clean the flow meter 5. Coating therefore is undesirable in the flow meter 5.

Prior art methods for detecting coating include processes such as generating a density error measurement, determining a flow conduit damping level, etc. Unfortunately, prior art methods for detecting coating rely on additional knowledge of the process fluid.

Coating will deposit a thermally insulating barrier between the process fluid and the flow conduit. As a result of this thermal insulation, the temperature error factor $T_{error}$ will no longer be correct and will deviate significantly from ideal operation and an ideal zero value. Coating can therefore be determined through a comparison of the derived fluid temperature $T_{f\text{-}deriv}$—to the actual, measured fluid temperature $T_{f\text{-}meas}$, such as produced by the fluid temperature sensor 210

(see FIG. 6 and the accompanying text below). This comparison can be made in the meter electronics 20. Alternatively, the comparison can be made by an external device.

Figure 6:
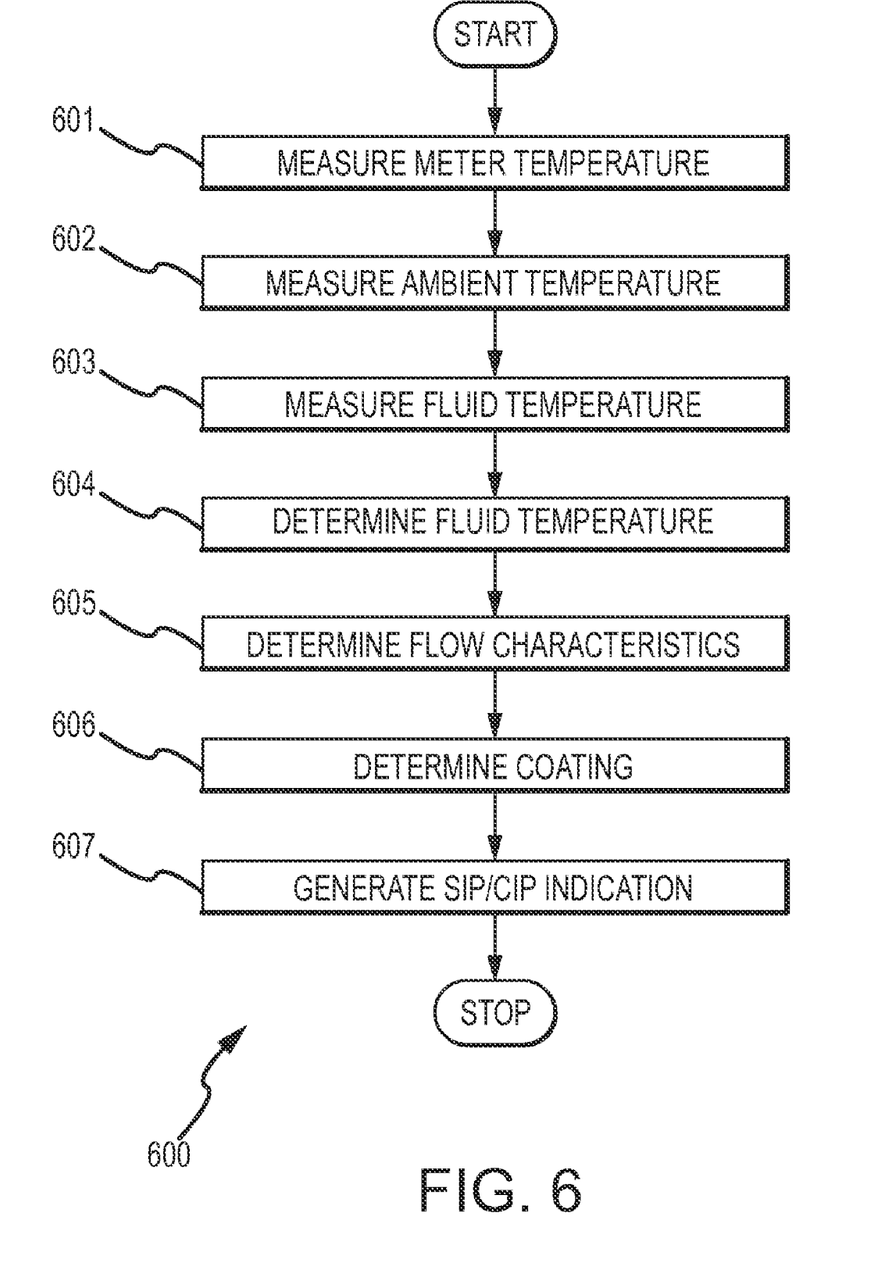
FIG. 6 is a flowchart of a method for determining the derived fluid temperature $T_{f\text{-}deriv}$ of a flow material in a vibratory flow meter according to an embodiment of the invention.

FIG. 6 is a flowchart 600 of a method for determining the derived fluid temperature $T_{f\text{-}deriv}$ of a flow material in a vibratory flow meter according to an embodiment of the invention. In step 601, the temperature of the flow meter is measured, as previously discussed.

In step 602, an ambient temperature $T_a$ is measured, as previously discussed.

In step 603, a fluid temperature is measured in order to produce the measured fluid temperature $T_{f\text{-}meas}$. The measure fluid temperature $T_{f\text{-}meas}$ can be measured at any point in or near the flow meter 5 and can be measured through any manner of temperature measuring device or process.

In step 604, the derived fluid temperature $T_{f\text{-}deriv}$ is determined from the meter temperature $T_m$ and the ambient temperature $T_a$, as previously discussed.

In step 605, one or more flow characteristics are determined using the derived fluid temperature $T_{f\text{-}deriv}$, as previously discussed.

In step 606, a coating level is determined in a flow conduit (or flow conduits) of the flow meter 5. The coating level is determined using the measured fluid temperature $T_{f\text{-}meas}$, as compared to the derived fluid temperature $T_{f\text{-}deriv}$ from step 604, above. A temperature error factor $T_{error}$ is computed between the measured and computed fluid temperatures, where $T_{error}=|T_{f\text{-}meas}-T_{f\text{-}deriv}|$. The temperature error factor $T_{error}$ is compared to a predetermined coating threshold. If the temperature error factor $T_{error}$ does not exceed the predetermined coating threshold, then it is determined that coating does not exist in the flow conduit or flow conduits. If the temperature error factor $T_{error}$ exceeds the predetermined coating threshold, then it is determined that coating has occurred in the flow conduit or flow conduits.

A coating determination can result in the generation of some manner of coating indication. The coating indication can include generating some manner of alarm or other indication. The coating indication can result in any needed manner of cleaning operation, including prompting a SIP/CIP process for the flow conduit or flow conduits, where appropriate.

In step 607, a Sterilize-In-Place (SIP) and/or Clean-In-Place (CIP) success indication is generated if the coating indication is not generated. Otherwise, if the coating indication is generated, then the SIP/CIP success indication may not be generated.

The SIP/CIP success indication indicates the success of a SIP/CIP process. If a SIP/CIP success indication has been generated, then a SIP or CIP process can be determined to not be necessary, where no SIP or CIP process has been performed. Where a SIP or CIP process has already been performed, then a SIP or CIP process can be determined to have failed if the SIP/CIP success indication is not generated.

What is claimed is:

1. A vibratory flow meter (5) for determining a derived fluid temperature $T_{f\text{-}deriv}$ of a flow material, comprising:
    a flow meter assembly (10) including one or more flow conduits (103);
    a meter temperature sensor (204) configured to measure a meter temperature $T_m$;
    an ambient temperature sensor (208) for measuring an ambient temperature $T_a$; and
    meter electronics (20) coupled to the meter temperature sensor (204) and to the ambient temperature sensor (208) and configured to receive the meter temperature $T_m$ and the ambient temperature $T_a$ and determine the derived fluid temperature $T_{f\text{-}deriv}$ of the flow material in the vibratory flow meter (5) using the meter temperature $T_m$ and the ambient temperature $T_a$.

2. The vibratory flow meter (5) of claim 1, with determining the derived fluid temperature $T_{f\text{-}deriv}$ further comprising employing the equation $$T_{f\text{-}deriv} = \frac{(T_m - T_a C_e)}{(1 - C_e)},$$

with $C_e$ comprising a temperature error coefficient.

3. The vibratory flow meter (5) of claim 1, with the meter electronics (20) being further configured to use the derived fluid temperature $T_{f\text{-}deriv}$ for determining one or more flow characteristics of the flow material.

4. The vibratory flow meter (5) of claim 1, with the meter electronics (20) being further configured to use the derived fluid temperature $T_{f\text{-}deriv}$ for compensating a flow conduit stiffness.

5. The vibratory flow meter (5) of claim 1, further comprising a fluid temperature sensor (210) configured to measure a fluid temperature $T_{f\text{-}meas}$ of the flow material, with the meter electronics (20) being configured to determine the derived fluid temperature $T_{f\text{-}deriv}$ of the flow material in the vibratory flow meter using the meter temperature $T_m$ and the ambient temperature $T_a$, and determine a coating level within one or more flow conduits of the vibratory flow meter using a difference between the measured fluid temperature $T_{f\text{-}meas}$ and the derived fluid temperature $T_{f\text{-}deriv}$.

6. The vibratory flow meter (5) of claim 5, with the meter electronics (20) being further configured to determine a temperature error factor $T_{error}$ comprising $T_{error}=|T_{f\text{-}meas}-T_{f\text{-}deriv}|$, compare the temperature error factor $T_{error}$ to a predetermined coating threshold, and generate a coating indication if the temperature error factor $T_{error}$ exceeds the predetermined coating threshold.

7. The vibratory flow meter (5) of claim 5, with the meter electronics (20) being further configured to determine a temperature error factor $T_{error}$ comprising $T_{error}=|T_{f\text{-}meas}-T_{f\text{-}deriv}|$, compare the temperature error factor $T_{error}$ to a predetermined coating threshold, and generate a Sterilization-In-Place (SIP) and/or Clean-In-Place (CIP) indication if the temperature error factor $T_{error}$ exceeds the predetermined coating threshold.

8. A method for determining a derived fluid temperature $T_{f\text{-}deriv}$ of a flow material in a vibratory flow meter, the method comprising:
    measuring a meter temperature $T_m$;
    measuring an ambient temperature $T_a$; and
    determining the derived fluid temperature $T_{f\text{-}deriv}$ of the flow material in the vibratory flow meter using the meter temperature $T_m$ and the ambient temperature $T_a$.

9. The method of claim 8, with determining the derived fluid temperature $T_{f\text{-}deriv}$ further comprising employing the equation $$T_{f\text{-}deriv} = \frac{(T_m - T_a C_e)}{(1 - C_e)},$$

with $C_e$ comprising a temperature error coefficient.

10. The method of claim 8, further comprising using the derived fluid temperature $T_{f\text{-}deriv}$ for determining one or more flow characteristics of the flow material.

11. The method of claim 8, further comprising using the derived fluid temperature $T_{f\text{-}deriv}$ for compensating a flow conduit stiffness.

12. The method of claim 8, further comprising:
measuring a measured fluid temperature $T_{f\text{-}meas}$;
determining a temperature error factor $T_{error}$, comprising $T_{error}=|T_{f\text{-}meas}-T_{f\text{-}deriv}|$;
comparing the temperature error factor $T_{error}$ to a predetermined coating threshold; and
generating a coating indication if the temperature error factor $T_{error}$ exceeds the predetermined coating threshold.

13. The method of claim 8, further comprising:
measuring a measured fluid temperature $T_{f\text{-}meas}$;
determining a temperature error factor $T_{error}$ comprising $T_{error}=|T_{f\text{-}meas}-T_{f\text{-}deriv}|$;
comparing the temperature error factor $T_{error}$ to a predetermined coating threshold; and
generating a Sterilization-In-Place (SIP) and/or Clean-In-Place (CIP) indication if the temperature error factor $T_{error}$ exceeds the predetermined coating threshold.

14. A method for determining a derived fluid temperature $T_{f\text{-}deriv}$ of a flow material in a vibratory flow meter, the method comprising:
measuring a meter temperature $T_m$;
measuring an ambient temperature $T_a$;
determining the derived fluid temperature $T_{f\text{-}deriv}$ of the flow material in the vibratory flow meter using the meter temperature $T_m$ and the ambient temperature $T_a$; and
determining one or more flow characteristics of the flow material using the fluid temperature.

15. The method of claim 14, with determining the derived fluid temperature $T_{f\text{-}deriv}$ further comprising employing the equation $$T_{f\text{-}deriv} = \frac{(T_m - T_a C_e)}{(1 - C_e)},$$

with $C_e$ comprising a temperature error coefficient.

16. The method of claim 14, further comprising using the derived fluid temperature $T_{f\text{-}deriv}$ for compensating a flow conduit stiffness.

17. The method of claim 14, further comprising:
measuring a measured fluid temperature $T_{f\text{-}meas}$;
determining a temperature error factor $T_{error}$ comprising $T_{error}=|T_{f\text{-}meas}-T_{f\text{-}deriv}|$;
comparing the temperature error factor $T_{error}$ to a predetermined coating threshold; and
generating a coating indication if the temperature error factor $T_{error}$ exceeds the predetermined coating threshold.

18. The method of claim 14, further comprising:
measuring a measured fluid temperature $T_{f\text{-}meas}$;
determining a temperature error factor $T_{error}$ comprising $T_{error}=|T_{f\text{-}meas}-T_{f\text{-}deriv}|$;
comparing the temperature error factor $T_{error}$ to a predetermined coating threshold; and
generating a Sterilization-In-Place (SIP) and/or Clean-In-Place (CIP) indication if the temperature error factor $T_{error}$ exceeds the predetermined coating threshold.

19. A method for determining a derived fluid temperature $T_{f\text{-}deriv}$ of a flow material in a vibratory flow meter, the method comprising:
measuring a meter temperature $T_m$;
measuring an ambient temperature $T_a$;
measuring a fluid temperature $T_{f\text{-}meas}$;
determining the derived fluid temperature $T_{f\text{-}deriv}$ of the flow material in the vibratory flow meter using the meter temperature $T_m$ and the ambient temperature $T_a$; and
determining a coating level within one or more flow conduits of the vibratory flow meter using a difference between the measured fluid temperature $T_{f\text{-}meas}$ and the derived fluid temperature $T_{f\text{-}deriv}$.

20. The method of claim 19, with determining the derived fluid temperature $T_{f\text{-}deriv}$ further comprising employing the equation $$T_{f\text{-}deriv} = \frac{(T_m - T_a C_e)}{(1 - C_e)},$$

with $C_e$ comprising a temperature error coefficient.

21. The method of claim 19, further comprising using the derived fluid temperature $T_{f\text{-}deriv}$ for determining one or more flow characteristics of the flow material.

22. The method of claim 19, further comprising using the derived fluid temperature $T_{f\text{-}deriv}$ for compensating a flow conduit stiffness.

23. The method of claim 19, with determining the coating level further comprising:
determining a temperature error factor $T_{error}$ comprising $T_{error}=|T_{f\text{-}meas}-T_{f\text{-}deriv}|$;
comparing the temperature error factor $T_{error}$ to a predetermined coating threshold; and
generating a coating indication if the temperature error factor $T_{error}$ exceeds the predetermined coating threshold.

24. The method of claim 19, further comprising:
determining a temperature error factor $T_{error}$ comprising $T_{error}=|T_{f\text{-}meas}-T_{f\text{-}deriv}|$;
comparing the temperature error factor $T_{error}$ to a predetermined coating threshold; and
generating a Sterilization-In-Place (SIP) and/or Clean-In-Place (CIP) indication if the temperature error factor $T_{error}$ exceeds the predetermined coating threshold.

* * * * *

UNITED STATES PATENT AND TRADEMARK OFFICE
CERTIFICATE OF CORRECTION

PATENT NO. : 8,302,491 B2  
APPLICATION NO. : 12/678815  
DATED : November 6, 2012  
INVENTOR(S) : Charles Paul Stack Page 1 of 1

It is certified that error appears in the above-identified patent and that said Letters Patent is hereby corrected as shown below:

Column 7, Line 27 replace the equation with $$-- \dot{m} = FCF \cdot (1 - \phi_1 \cdot \Delta T - \phi_2 \cdot \Delta T^2 - \phi_3 \cdot \Delta T^3 - \phi_4 \cdot \Delta T^4) \cdot (\Delta t - zero) --$$

Signed and Sealed this  
Twenty-sixth Day of March, 2013

Teresa Stanek Rea  
*Acting Director of the United States Patent and Trademark Office*